(12) United States Patent
Han et al.

(10) Patent No.: US 11,284,234 B2
(45) Date of Patent: Mar. 22, 2022

(54) CLOUD-ASSISTED VIRTUAL VEHICULAR COMMUNICATION

(71) Applicant: Toyota Motor Engineering & Manufacturing North America, Inc., Plano, TX (US)

(72) Inventors: Kyungtae Han, Mountain View, CA (US); Ahmed Hamdi Sakr, Mountain View, CA (US); Prashant Tiwari, Mountain View, CA (US)

(*) Notice: Subject to any disclaimer, the term of this patent is extended or adjusted under 35 U.S.C. 154(b) by 194 days.

(21) Appl. No.: 16/684,252

(22) Filed: Nov. 14, 2019

(65) Prior Publication Data

US 2021/0152995 A1 May 20, 2021

(51) Int. Cl.
*H04W 4/46* (2018.01)
*H04L 29/08* (2006.01)
*G08G 1/01* (2006.01)
*H04L 67/125* (2022.01)

(52) U.S. Cl.
CPC ............ *H04W 4/46* (2018.02); *G08G 1/0112* (2013.01); *H04L 67/125* (2013.01)

(58) Field of Classification Search
CPC ....... H04W 4/46; G06G 1/0112; H04L 67/125
See application file for complete search history.

(56) References Cited

U.S. PATENT DOCUMENTS

| 9,542,509 | B2 | 1/2017 | Martinez Canedo et al. |
| 10,129,022 | B1 | 11/2018 | Al Faruque et al. |
| 10,205,733 | B1 | 2/2019 | Park et al. |
| 10,250,619 | B1 | 4/2019 | Park et al. |
| 2018/0060456 | A1 | 3/2018 | Phatak et al. |
| 2019/0014526 | A1 | 1/2019 | Bader et al. |

FOREIGN PATENT DOCUMENTS

| DE | 102015002367 | 2/2015 |
| EP | 3287901 | 2/2018 |

OTHER PUBLICATIONS

Sangiovanni-Vincentelli, et al., "Taming Dr. Frankenstein: Contract-Based Design for Cyber-Physical Systems," European Journal of Control (2012)3, pp. 217-238.

(Continued)

*Primary Examiner* — Brian Whipple
(74) *Attorney, Agent, or Firm* — Burbage Law, P.C.; Jon-Michael Burbage; Elizabeth Ruzich

(57) ABSTRACT

The disclosure includes embodiments for a cloud server to transmit a set of wireless communications. A method includes wirelessly receiving, by the cloud server, context data from a set of connected vehicles, where the context data describes (1) a context for the set of connected vehicles and (2) a set of vehicular communications to be sent by the set of connected vehicles, including digital data describing payloads and recipients for these vehicular communications. The method includes executing a set of digital twin simulations based on the context data to generate communication plan data describing a communication plan for transmitting a set of non-vehicular communications which include a same payloads and recipients for the set of vehicular communications. The method includes wirelessly transmitting, by the cloud server, the set of non-vehicular communications in compliance with the communication plan and the standards governing transmission of vehicular communications.

20 Claims, 4 Drawing Sheets

(56) References Cited

OTHER PUBLICATIONS

Watanabe, et al., "Runtime monitoring for safety of intelligent vehicles," 55th ACM/ESDA/IEEE Design Automation Conference (DAC), 2018, 6 pages.
Benveniste, et al., "Contracts for System Design," Foundations and Trends in Electronic Design Automation, vol. 12, No. 2-3, 2018, 124-400.
Nguyen, et al., "Assertion-based monitoring in practice-checking correctness of an automotive sensor interface," Science of Computer Programming 118 (2016): 40-59.
Vyatkin, et al., "Software engineering in industrial automation: State-of-the-art review," IEEE Transactions on Industrial Infomatics, vol. 9, No. 3, Aug. 2013, 1234-1249.

300

Start

Wirelessly receiving, by a cloud server, context data from a set of connected vehicles, wherein the context data describes (1) a context for the set of connected vehicles and (2) a set of wireless communications to be sent by the set of connected vehicles

305

Execute a set of digital twin simulations based on the context data to generate communication plan data describing a communication plan for transmitting the set of wireless communication

310

Wirelessly transmitting, by the cloud server, the set of wireless communications in compliance with the communication plan.

CLOUD-ASSISTED VIRTUAL VEHICULAR COMMUNICATION

BACKGROUND

The specification relates to cloud-assisted virtual Vehicle-to-Vehicle (V2V), Vehicle-to-Infrastructure (V2I) communication, and/or Vehicle-to-Everything communications (V2X). V2V, V2I, and V2X communication are referred to herein as "vehicular communication," collectively in any combination or individually.

Standards exist that govern most forms of vehicular communication. These standards have rules which must be followed by the endpoints that participate in vehicular communications. Vehicles need to send many different types of communications to one another in a short time frame. Vehicular networks include wireless communication channels. Some or all of the wireless communication channels become congested and create bottlenecks if the network is being used for a large number of vehicles to send and receive wireless communications. For vehicular networks having a large number of vehicles, the wireless communication channels of vehicular networks are more likely to become contested and the vehicular network may become unusable in some situations. What is needed is a way to reduce wireless communication channel congestion for vehicular networks without violating any of the rules of the standards which govern vehicular communications.

SUMMARY

Described herein are embodiments of a digital twin communication system (herein "DT communication system"). A V2V, V2I, or V2X communication is referred to herein as a "vehicular communication" because the endpoint which originates this communication is a vehicle. As used herein a cloud server is not an element of a vehicle. Wireless communications which are not vehicular communications may be referred to herein as "non-vehicular communications."

Some embodiments described herein relate to a cloud server that uses digital twin simulations in the course of completing a set of non-vehicular communications on behalf of a vehicle which achieves the result of a set of vehicular communications which the vehicle was to transmit; the digital twin simulations virtually simulate the completion of the vehicular communications.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer program product including computer code installed in a memory of a cloud server when is operable, when executed by a processor of the cloud server, to cause the processor to execute steps including: wirelessly receiving, by the cloud server, context data from a set of connected vehicles, where the context data describes (1) a context for the set of connected vehicles and (2) a set of vehicular communications to be sent by the set of connected vehicles, including digital data describing payloads and recipients for these vehicular communications; executing a set of digital twin simulations based on the context data to generate communication plan data describing a communication plan for transmitting a set of non-vehicular communications which include a same payloads and recipients for the set of vehicular communications; and wirelessly transmitting, by the cloud server, the set of non-vehicular communications in compliance with the communication plan and standards governing transmission of vehicular communications. Other embodiments of this aspect include corresponding computer systems, apparatus, and computer programs recorded on one or more computer storage devices, each configured to perform the actions of the methods.

Implementations may include one or more of the following features. The computer program product where the cloud server is an only endpoint that transmits the set of non-vehicular communications. The computer program product where the context includes one or more a current context for the set of connected vehicles and a future expected context of the set of connected vehicles. The computer program product where the context data further describes deadlines for the set of wireless and the set of non-vehicular communications are transmitted by the cloud server in compliance with the deadlines. The computer program product where the set of digital twin simulations is consistent with the context data so that digital twin simulations included in the set exactly simulate one or more of the following: what the set of connected vehicles are experiencing presently in a real-world; and what the set of connected vehicles are predicted to experience in a future in the real-world. The computer program product where the digital twin simulations include a virtual execution of non-vehicular communications which achieve the same result as the vehicular communications described by the context data because they have the same payloads described by the context data, the same receipts described by the context data, and satisfy the same deadlines described by the context data (if any deadlines are described by the context data); these non-vehicular communications may be referred to herein as "non-vehicular versions of the wireless communications described by the context data." The computer program product where the virtual executions occur in various ways in the digital twin simulations so that the communication plan is optimized based on the execution of the digital twin simulations. Implementations of the described techniques may include hardware, a method or process, or computer software on a computer-accessible medium.

One general aspect includes a method including: wirelessly receiving, by a cloud server, context data from a set of connected vehicles, where the context data describes (1) a context for the set of connected vehicles and (2) a set of wireless communications to be sent by the set of connected vehicles; executing a set of digital twin simulations based on the context data to generate communication plan data describing a communication plan for transmitting the set of wireless communication; and wirelessly transmitting, by the cloud server, the set of wireless communications in compliance with the communication plan. Other embodiments of this aspect include corresponding computer systems, apparatus, and computer programs recorded on one or more computer storage devices, each configured to perform the actions of the methods.

Implementations may include one or more of the following features. The method where the cloud server is an only endpoint that transmits the set of wireless communications. The method where the context includes one or more a current context for the set of connected vehicles and a future expected context of the set of connected vehicles. The method where the context data describes: (1) payloads for the set of wireless communications; (2) deadlines for the set of wireless communications, and (3) intended end recipients for the payloads. The method where the set of digital twin simulations is consistent with the context data so that digital twin simulations included in the set reflect one or more of the following: what the set of connected vehicles are experiencing presently in a real-world; and what the set of connected vehicles are predicted to experience in a future in the real-world. The method where the digital twin simulations include a virtual execution of non-vehicular versions of the wireless communications described by the context data. The method where the virtual executions occur in various ways in the digital twin simulations so that the communication plan is optimized based on the execution of the digital twin simulations. Implementations of the described techniques may include hardware, a method or process, or computer software on a computer-accessible medium.

One general aspect includes a system of a cloud server including: a communication unit which is operable to wirelessly receive context data from a set of connected vehicles, where the context data describes (1) a context for the set of connected vehicles and (2) a set of wireless communications to be sent by the set of connected vehicles; a processor communicatively coupled to the communication unit to receive the context data from the communication unit, where the processor is operable execute a set of digital twin simulations based on the context data to generate communication plan data describing a communication plan for transmitting the set of wireless communication and the communication unit is operable to wirelessly transmit the set of wireless communications in compliance with the communication plan. Other embodiments of this aspect include corresponding computer systems, apparatus, and computer programs recorded on one or more computer storage devices, each configured to perform the actions of the methods.

Implementations may include one or more of the following features. The system where the cloud server is an only endpoint that transmits the set of wireless communications. The system where the context includes one or more a current context for the set of connected vehicles and a future expected context of the set of connected vehicles. The system where the context data describes: (1) payloads for the set of wireless communications; (2) deadlines for the set of wireless communications, and (3) intended end recipients for the payloads. The system where the set of digital twin simulations is consistent with the context data so that digital twin simulations included in the set reflect one or more of the following: what the set of connected vehicles are experiencing presently in a real-world; and what the set of connected vehicles are predicted to experience in a future in the real-world. The system where the digital twin simulations include a virtual execution of the non-vehicular versions of the wireless communications described by the context data and the communication plan is optimized based on the execution of the digital twin simulations. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 3 is a flowchart of an example method for a cloud server to transmit a set of wireless communications according to some embodiments.

DETAILED DESCRIPTION

Figure 1:
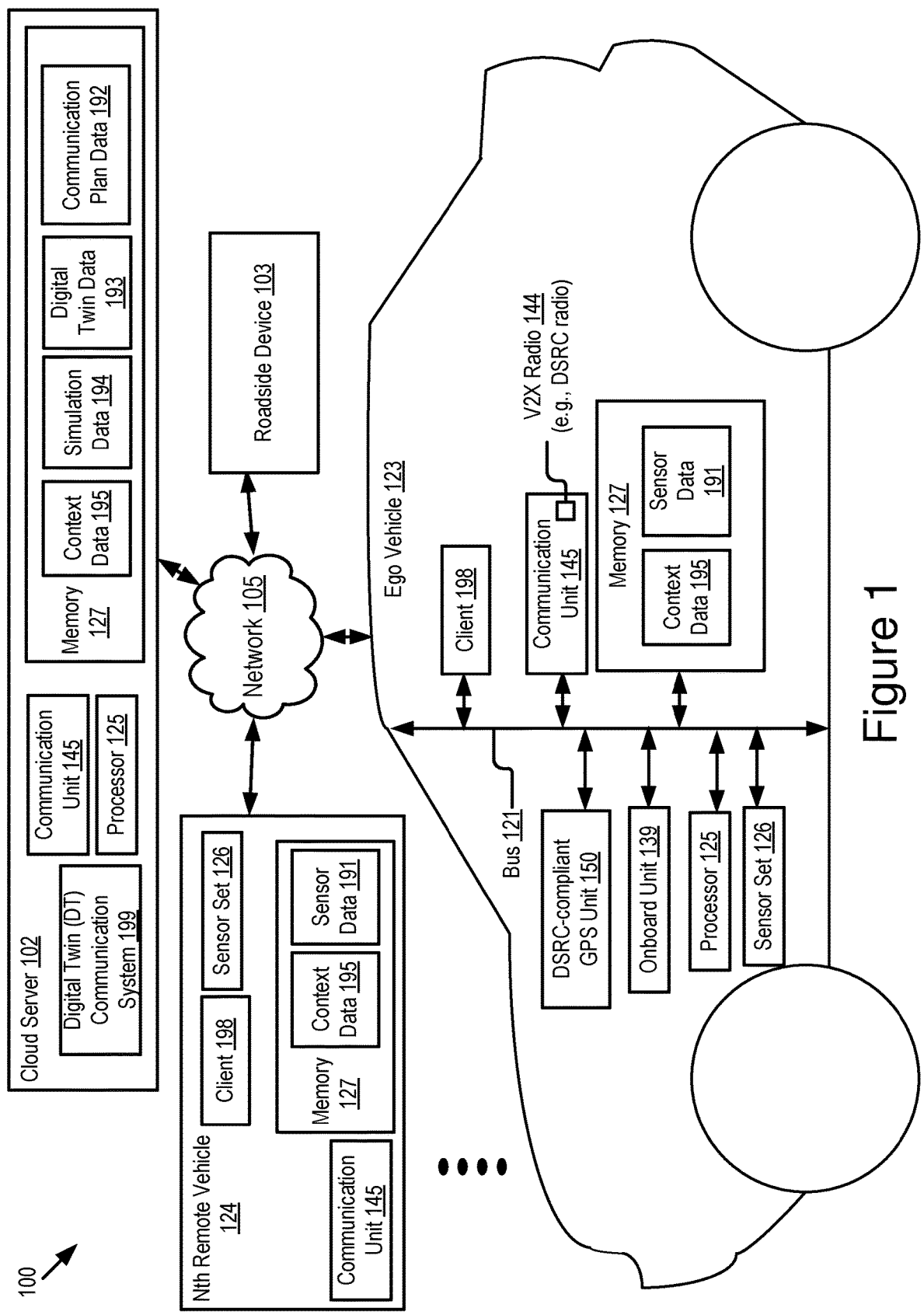
FIG. 1 is a block diagram illustrating an operating environment for a digital twin communication system (herein "DT communication system") according to some embodiments.

Described herein are embodiments of a digital twin communication system (herein "DT communication system") and a client. The DT communication system is installed in a non-transitory memory of a cloud server or some other connected non-vehicular endpoint. The client is installed in an onboard unit of a vehicle. As used herein, the term "vehicle" as used in reference to the vehicle, an ego vehicle, a remote vehicles, or "recipients" refers to a connected vehicle having wireless communication capability with a network such as depicted in FIG. 1.

A V2V, V2I, or V2X communication is referred to herein as a "vehicular communication" because the endpoint which originates this communication is a vehicle. For example, a wireless message which originates from a vehicle and is transmitted by the vehicle to a RSU is a vehicular communication because the endpoint which originates this wireless message is a vehicle; this is true even if there are hops or relays between the vehicle and the RSU in the transmission of this wireless message. By comparison, a wireless message that originates from a cloud server and is transmitted by the cloud server to a vehicle is not a vehicular communication because the endpoint which originates this wireless message is not a vehicle. As used herein a cloud server is not an element of a vehicle. Wireless communications which are not vehicular communications may be referred to herein as "non-vehicular communications."

In some embodiments, the DT communication system includes code and routines that are operable, when executed by a processor of the cloud server, to execute steps that are consistent with achieving the functionality described herein. The DT communication system uses digital twin simulations in the course of completing a set of non-vehicular communications on behalf of a vehicle which achieve the result of a set of vehicular communications which the vehicle was to transmit; in this way, the cloud server transmits the set of non-vehicular communications on behalf of the vehicle so that the vehicle does not transmit the set of vehicular communications.

In some embodiments, the DT communication system uses a set of digital twin simulations to generate communication plan data describing a communication plan for transmitting the set of non-vehicular communications. The digital twin simulation system causes the cloud server to transmit the set of non-vehicular communications in accordance with the communication plan.

In some embodiments, the digital twin simulations are based in part on context data. The context data is generated by the client installed in the vehicle and wirelessly transmitted by the vehicle to the cloud server. The cloud server may receive context data during a time period from many different vehicles and the DT communication system may process the context data as a batch for all vehicles or on a vehicle-by-vehicle basis.

In some embodiments, a vehicle which transmits context data to the cloud server during the period is referred to herein as an ego vehicle. For the purpose of clarity, the functionality of the DT communication system is now described from the perspective of an ego vehicle and a set of remote vehicles. The context data includes digital data that describes: (1) a context for the ego vehicle and the set of remote vehicles which are recipients for the non-vehicular communications which are ultimately sent by the cloud server; and (2) the set of vehicular communications which the ego vehicle was to transmit to the set of remote vehicles, including the payload for these vehicular communications and identifiers which of the set of remote vehicles is to receive which of the payloads (described another way, the context data describes identifiers for the recipients of these vehicular communications). In some embodiments, the context data also describes, for each vehicular communication, any deadline for when the vehicular communication is to be received by recipient. The set of non-vehicular communications transmitted by the cloud server include the payloads for these vehicular communications and are transmitted to the recipients identified by the context data. If a vehicular communication had a deadline, then the corresponding non-vehicular communication is transmitted at a time that satisfies this deadline.

In some embodiments, the cloud server includes simulation software (and digital data describing a set of digital twins. The set of digital twins are virtual versions of the real-world vehicles assisted by a by the DT communication system. The digital data that describes the set of digital twins is referred to herein as digital twin data.

The real-world vehicles provide context data to the cloud server. The context data is digital data that describes Part 1 and Part 2 which are described below:

Part 1—the current context or future expected context of the real-world vehicles; and Part 2—the vehicular communications that these real-world vehicles need to complete in the future, including: (1) the payload for these communications; (2) deadlines for these communications; and (3) the intended recipient for this payload.

The simulation software includes code and routines that are operable, when executed by a processor of the cloud server, to cause the processor to generate a set of digital twin simulations that include the digital twins. In some embodiments, the simulation software generates the digital twin simulations based at least in part on the context data and the digital twin data. The current context of the real-world vehicles described by the context data includes any sensor data that describes the roadway environment of the real-world vehicles so that the simulation generated by the processor can digitally replicate the roadway environment of these real-world vehicles. In some embodiments, the replication of the real-world included in the digital twin simulations is 100% accurate or near 100% accurate relative to what actually exists in the real-world as described by the sensor data.

In some embodiments, these digital twin simulations generated by the simulation software are consistent with the context data that is received from the real-world vehicles so that the digital twin simulations reflect what the real-world vehicles are experiencing or might experience in the future. In some embodiments, these digital twin simulations also include the virtual execution of non-vehicular versions of the vehicular communications that these real-world vehicles are to complete in the future as described by Part 2 of the context data. In some embodiments, these virtual executions occur in various ways in the digital twin simulations so that an optimum communication plan for these communications can be determined by the DT communication system which is now described.

The cloud server includes the DT communication system. The DT communication system monitors the digital twin simulations as they are executed. The DT communication system monitors the digital twin simulations and generates a communication plan data based on what it observes during these digital twin simulations. For example, the DT communication system: (1) observes patterns from the execution of virtualized versions of non-vehicular communications which correspond to the vehicular communications described by the context data; and (2) determines an optimum communication plan for transmitting a set of non-vehicular communications that correspond to these vehicular communications. The non-vehicular communications correspond to the vehicular communications because they are transmitted to the same recipients, include the same payload, and satisfy any deadline which is described in the context data which describes these vehicular communications. Put another way, the non-vehicular communications described by the communication plan achieves, when transmitted by the cloud server, the desired result of transmitting the set of vehicular communications that are described by the context data.

In some embodiments, the communication plan data is digital data that describes a communication plan for how the non-vehicular communications are to be transmitted; the non-vehicular communications described by the communication plan are those which achieve the desired result of transmitting the set of vehicular communications which the vehicle was to transmit. The communication plan data considers all critical information, including, for example: the recipients for these wireless communications; the deadlines for these wireless communications; the anticipated latency for transmitting these wireless communications (because, for example, this latency may affect the deadlines); the payloads to be included in these wireless communications; factors which make some wireless communications more important than other such as whether transmission of the wireless communication increases the safety of a vehicle or would prevent a collision (such wireless communications may be given a higher priority and transmitted sooner than others); and other factors which are related to or derivative of those described here.

The DT communication system causes the cloud server to transmit a set of non-vehicular communications based on the communication plan data. In this way, the cloud server successfully transmits, in the real-world, a non-vehicular communication for each of the vehicular communications that the real-world vehicles were to complete in the future as described by Part 2 of the context data. Each of the non-vehicular communications are completed before any deadline occurs. These non-vehicular communications also include the appropriate payloads and are completed in accordance with the communication plan which was determined based on the digital twin simulations. In this way, the real-world vehicles offload responsibility for completing their real-world vehicular communications to the cloud server which itself uses digital twin simulations to optimize the completion of non-vehicular versions of these vehicular communications in the real word.

In some embodiments, the DT communication system is a standalone simulation software that includes code and routines that are operable to provide the functionality of the DT communication system as described above. In some embodiments, the DT communication system is a plugin for an existing simulation software.

In some embodiments, the DT communication system is beneficially operable to help vehicles to successfully complete wireless communications before they are in V2V, V2I, and/or V2X communication range of one another and before a safety critical event occurs (e.g., a wreck or collision, a near miss, or any other type of event occurring on a roadway which might affect a driver's safety or diminish the driver's confidence in the ability of their vehicle to keep them safe).

In some embodiments, the DT communication system is beneficially operable to help two or more vehicles having a same manufacturer to use standardized V2V, V2I, and/or V2X communication methods while completing these communications in ways that are not constrained by the limitations of these standards; because of this the DT communication system beneficially enables the routing, planning, and successful transmission of non-vehicular communications in accordance with the priorities of an operator of the cloud server (e.g., a vehicular manufacturer) and not the priorities of the standards creation bodies (e.g., the bodies that create standards for V2V, V2I, and/or V2X communications. The functionality of the DT communication system is 100% compliant with the existing standards (e.g., the standards for V2V, V2I, and/or V2X communications).

Two examples of the functionality of the DT communication system are now described. These examples are intended to be illustrative and not limiting.

In a first example, a first vehicle is entering a highway via a merging ramp. A second vehicle is outside of V2V communication range with the first vehicle. The second vehicle is traveling on the highway in a lane that would meet the first vehicle as it enters the highway. The first vehicle and the second vehicle cannot communicate with one another because they are outside V2V communication range with one another. However, application of the functionality of the DT communication system in this scenario would solve this problem by enabling delivery of payloads between the first vehicle and the second vehicle via a set of non-vehicular communications transmitted by the cloud server before any determined deadlines (e.g., a time when an estimated collision might occur).

In a second example, a group of vehicles are communicating with one another over a congested wireless network channel. The congestion of the network channel makes communication between the vehicles either impossible, too slow due to latency, or too unreliable due to packet loss. However, application of the functionality of the DT communication system in this scenario would solve this problem by enabling delivery of payloads among the vehicles.

Existing solutions to these problems do not disclose or suggest, among other things, the following functionality which is provided by the DT communication system: a cloud server that includes a memory storing context data or communication plan data; connected vehicles that offload responsibility for transmitting their scheduled wireless messages to a cloud server; a cloud server that executes digital twin simulations to identify an optimal communication plan for transmitting the wireless communications on behalf of a set of connected vehicles; and a cloud server that executes a communication plan by actually transmitting the wireless communications to the various intended recipients of these wireless communications where the intended recipients are specified by the original vehicle.

In some embodiments, the DT communication system optimizes the communication plan to reduce latency inherent in wireless communications which are necessary to vehicular micro-clouds and/or vehicle cloudification such as described in U.S. patent application Ser. No. 15/799,964 filed on Oct. 31, 2017 and entitled "Identifying a Geographic Location for a Stationary Micro-Vehicular Cloud," the entirety of which is herein incorporated by reference.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

Embodiments of the DT communication system are now described. Referring now to FIG. 1, depicted is a block diagram illustrating an operating environment 100 for a DT communication system 199 according to some embodiments. In some embodiments, the operating environment 100 is present in a geographic region so that each of the elements of the operating environment 100 is present in the same geographic region.

The operating environment 100 may include one or more of the following elements: an ego vehicle 123 (referred to herein as a "vehicle 123" or an "ego vehicle 123"); a roadside device 103; an Nth remote vehicle 124 (where "N" refers to any positive whole number greater than one); a cloud server 102; and a roadside device 103. These elements of the operating environment 100 are communicatively coupled to one another via a network 105. These elements of the operating environment 100 are depicted by way of illustration. In practice, the operating environment 100 may include one or more of the elements depicted in FIG. 1. The Nth remote vehicle 124 may be referred to herein as a "remote vehicle 124" or a "vehicle 124." In some embodiments, the cloud server 102 is an element of the roadside device 103; however, the cloud server 102 is not an element of the ego vehicle 123, the remote vehicle 124, or any other vehicle or conveyance.

In the depicted embodiment, the ego vehicle 123 and the remote vehicle 124 include similar elements. For example, each of these elements of the operating environment 100 include their own client 198, processor 125, bus 121, memory 127, communication unit 145, onboard unit 139, sensor set 126, and client 198. These elements of the ego vehicle 123 and the remote vehicle 124 provide the same or similar functionality relative to one another. Accordingly, these descriptions will not be repeated herein. The roadside device 103 also includes a processor 125, bus 121, memory 127, and communication unit 145; the roadside device 103 may relay wireless messages among the endpoints of the network 105 and use these elements to provide this functionality.

In the depicted embodiment, the ego vehicle 123, remote vehicle 124, and the roadside device 103 may each store similar digital data. For example, the memory 127 of the ego vehicle 123 may store the context data 195 and the sensor data 191 and the memory 127 of the roadside device 103 may store any of the digital data depicted in FIG. 1 as stored by the memory 127 of the ego vehicle 123.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network, V2V network, and/or V2I network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is referred to as a "vehicular network."

In some embodiments, one or more of the ego vehicle 123 and the remote vehicle 124 are DSRC-equipped vehicles. In some embodiments, the roadside device 103 is a DSRC-equipped device. For example, the ego vehicle 123 includes a DSRC-compliant GPS unit 150 and a DSRC radio (e.g., the V2X radio 144 is a DSRC radio in embodiments where the ego vehicle 123 is a DSRC-equipped vehicle) and the roadside device 103 includes a communication unit 145 having a DSRC radio similar to the one included in the ego vehicle 123. The V2X radio 144 is operable to transmit V2X messages, V2V messages, V2I messages, Basic Safety Messages, DSRC messages, etc. The network 105 may include a DSRC communication channel shared among the ego vehicle 123 and a remote vehicle 124.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a DSRC-compliant GPS unit 150; a communication unit 145; an onboard unit 139; a memory 127; and a client 198. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the DT communication system 199. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data 191 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data 191 that describes the roadway environment, the ego vehicle 123 itself (or the remote vehicle 124 if the sensor set 126 is an element of the remote vehicle 124), and any other information that is necessary for the generation of the digital twin data 193, the simulation data 194, or the communication plan data 192.

The physical environment may include a roadway region that is proximate to the ego vehicle 123. The sensor data 191 may describe measurable aspects of the physical environment.

In some embodiments, the sensors of the sensor set 126 are operable to collect sensor data 191. The sensors of the sensor set 126 include any sensors that are necessary to measure and record the measurements described by the sensor data 191.

In some embodiments, the sensor data 191 describes any of the information that is included in the context data 195, the simulation data 194, and the digital twin data 193 depicted in FIG. 1. In some embodiments, the sensor set 126 includes any sensors that are necessary to record the information that is included in the context data 195, the simulation data 194, and the digital twin data 193.

The context data 195 is digital data that includes two parts which are described below:

Part 1—the current context or future expected context of the real-world vehicles (e.g., the ego vehicle 123 and/or the remote vehicle 124); and Part 2—the vehicular communications that these real-world vehicles need to complete in the future, including: (1) the payload for these communications; (2) deadlines for these communications; and (3) the intended recipient for this payload.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the vehicle 123 may be accurately determined based on the GPS data for this vehicle 123 as provided by the DSRC-compliant GPS unit 150.

In some embodiments, the DSRC-compliant GPS unit 150 includes hardware that wirelessly communicates with a GPS satellite (or GPS server) to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the DT communication system 199 described herein may analyze the GPS data provided by the DSRC-compliant GPS unit 150 and determine what lane the ego vehicle 123 is traveling in based on the relative positions of two or more different vehicles (one of which is, for example, the ego vehicle 123) traveling on a roadway at the same time.

By comparison to the DSRC-compliant GPS unit 150, a conventional GPS unit which is not compliant with the DSRC standard is unable to determine the location of a vehicle 123 with lane-level accuracy. For example, a typical lane of a roadway is approximately 3 meters wide. However, a conventional GPS unit only has an accuracy of plus or minus 10 meters relative to the actual location of the ego vehicle 123. As a result, such conventional GPS units are not sufficiently accurate to enable the DT communication system 199 to determine the lane of travel of the ego vehicle 123. This measurement improves the accuracy of the GPS data, locating information, and ranging information that is included in the sensor data 191, the digital twin data 193, and/or the simulation data 194.

In some embodiments, the memory 127 stores GPS data and other ranging information describing the location of objects in the roadway environment as well as their location relative to the ego vehicle 123. This GPS data and ranging information is included in the sensor data 191 and describes the shapes of these objects and other information about these objects that is used to generate the simulation data 194 and/or the digital twin data 193.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message. In some embodiments, the V2X radio 144 includes one or more V2V transmitters and one or more V2V receivers. In some embodiments, the V2X radio 144 includes one or more V2I transmitters and one or more V2I receivers.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting Basic Safety Message ("BSM message" if singular, or "BSM messages" if plural). In some embodiments, the non-transitory memory stores a buffered version of the sensor data 191 for the ego vehicle 123 so that the GPS data for the ego vehicle 123 is broadcast as an element of the BSM messages which are regularly broadcast by the V2X radio 144 (e.g., at an interval of once every 0.10 seconds).

In some embodiments, the context data 195 is not included in the BSM messages which broadcast the sensor data 191 since the context data 195 is unicast to the cloud server 102 and not broadcast. According, the messages which provide the context data 195 to the cloud server 102 are not BSM messages or other comparable safety-related messages.

In some embodiments, the V2X radio 144 includes any hardware or software which is necessary to make the ego vehicle 123 compliant with the DSRC standards. In some embodiments, the DSRC-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 191; the and the context data 195. The context data 195 may include some or all of the sensor data 191.

The sensor data 191 is digital data that describes the environment of the connected vehicle. The sensor data 191 describes the measurements of the sensors included in the sensor set 126. In some embodiments, the DT communication system 199 includes code and routines that are operable, when executed by the processor 125, to cause the processor 125 to: execute or activate one or more sensors of the sensor set 126 to cause to record the sensor measurements that are described by the sensor data 195; and store these sensor measurements as the sensor data 195 in the memory 127.

In some embodiments, the client 198 includes object detector software which analyzes the sensor data 195 to provide the following functionality: identifying the objects within the roadway environment; identifying the location of each of these objects; determining the locations of these objects relative to the ego vehicle 123 (or the remote vehicle 124 if the client 198 is an element of the remote vehicle 124); determine the shape and/or size of these objects; and estimating the type of object (example types include: car; truck; van; bus; trailer; semi-truck; motorcycle; bicycle; pedestrian, median, edge of roadway; lane divider, etc.). In some embodiments, this information is included on the context data 195 and used to generate the digital twin data 193 and/or the simulation data 194.

Figure 4:
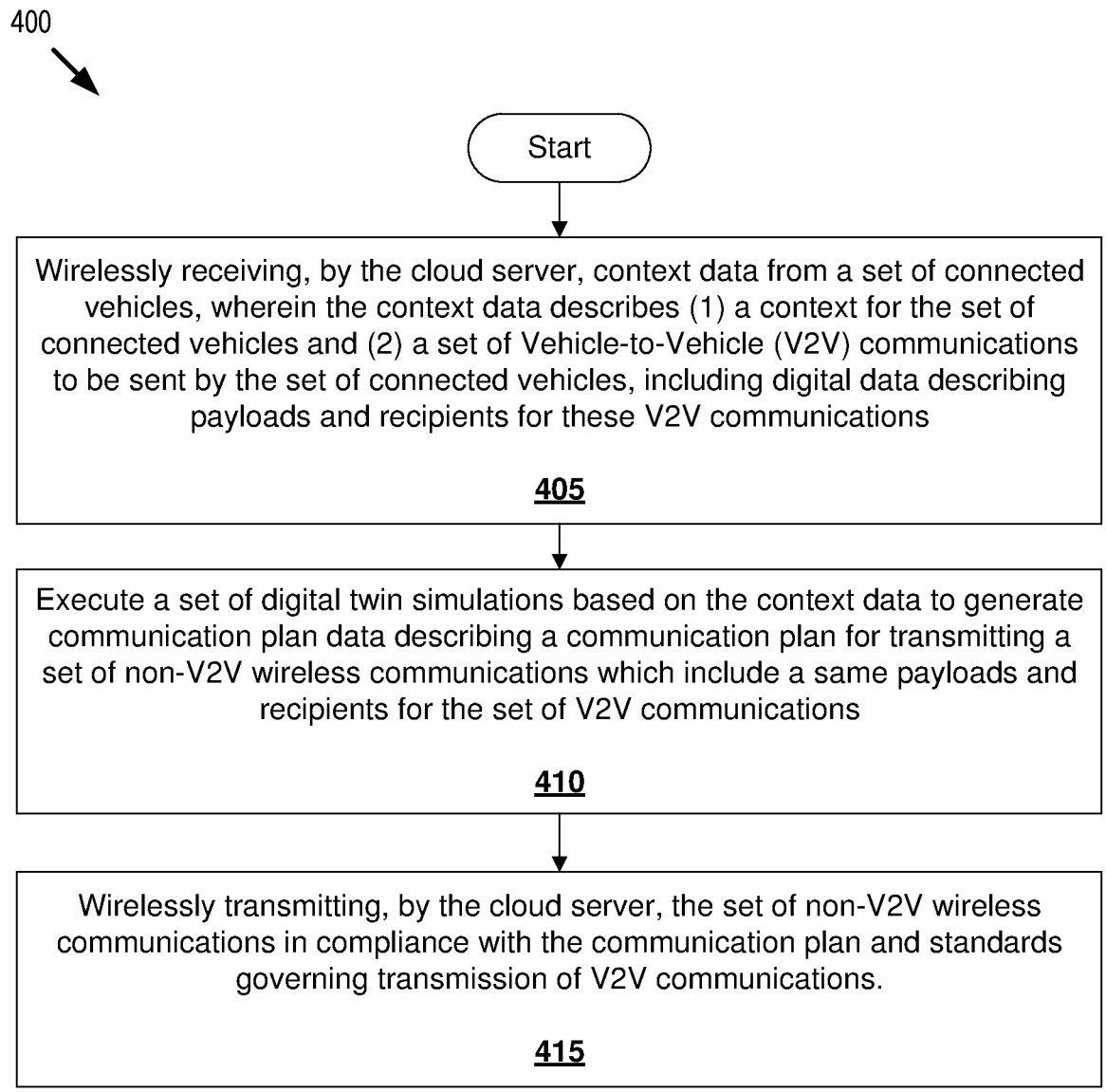
FIG. 4 is a flowchart of an example method for a cloud server to transmit a set of wireless communications according to some embodiments.

In some embodiments, the client 198 includes code and routines that are operable, when executed by the processor 125, to execute one or more steps of one or more of the methods 300, 400 described herein with reference to FIGS. 3 and 4, respectively.

In some embodiments, the client 198 includes code and routines that are operable to execute one or more of the following steps: (1) cause the sensor set 126 to record the roadway environment and generate the sensor data 191; (2) determine a set of vehicular messages to be transmitted; (3) determine deadlines for these vehicular messages, if any, and generate digital data describing these deadlines; (4) determine payloads for these vehicular messages and generate digital data describing these payloads for each vehicular message; (5) determine, for each vehicular message, whether the vehicular message is urgent, important, or safety critical and generate digital data describing this determination for each vehicular message; (5) determine a latency for the transmission of each vehicular message and generate digital data describing these latencies for the vehicular messages; (6) determine a recipient for each of these vehicular messages; (7) determine a unique identifier for ach vehicular message; (8) determine instructions for unicasting each vehicular message to its intended recipient; (9) determine the context data 195 based on the output of one or more of steps 1-8; and (10) store the context data 195 in the memory 127.

In some embodiments, the client 198 is implemented using hardware including a field-programmable gate array ("FPGA") or an application-specific integrated circuit ("ASIC"). In some other embodiments, the client 198 is implemented using a combination of hardware and software.

In some embodiments, the roadside device 103 is a connected device located within a roadway environment that includes either the ego vehicle 123, the remote vehicle 124, or both the ego vehicle 123 and the remote vehicle 124. For example, the roadside device 103 is an RSU or some other infrastructure device including the communication unit 145 and the processor 125.

The roadside device 103 includes the following elements: a memory 127; a bus 121; a processor 125; and a communication unit 145. These elements of the roadside device 103 provide similar functionality as those described above for the ego vehicle 123, and so, these descriptions will not be repeated here.

In some embodiments, the roadside device 103 is an edge server or includes an edge server. In some embodiments, the roadside device 103 includes the cloud server 102 as an element.

The remote vehicle 124 includes elements and functionality which are similar to those described above for the ego vehicle 123, and so, those descriptions will not be repeated here. In some embodiments, the ego vehicle 123 and the remote vehicle 124 are located in a geographic region which is managed by the cloud server 102.

The cloud server 102 is a connected processor-based computing device that includes the following elements: a memory 127; a communication unit 145; a processor 125; and a DT communication system 199. For example, the cloud server 102 is one or more of the following: a hardware server; a personal computer; a laptop; a device such as the roadside device 103; or any other processor-based connected device that is not a vehicle or a conveyance. The cloud server 102 may include a backbone network.

Figure 2:
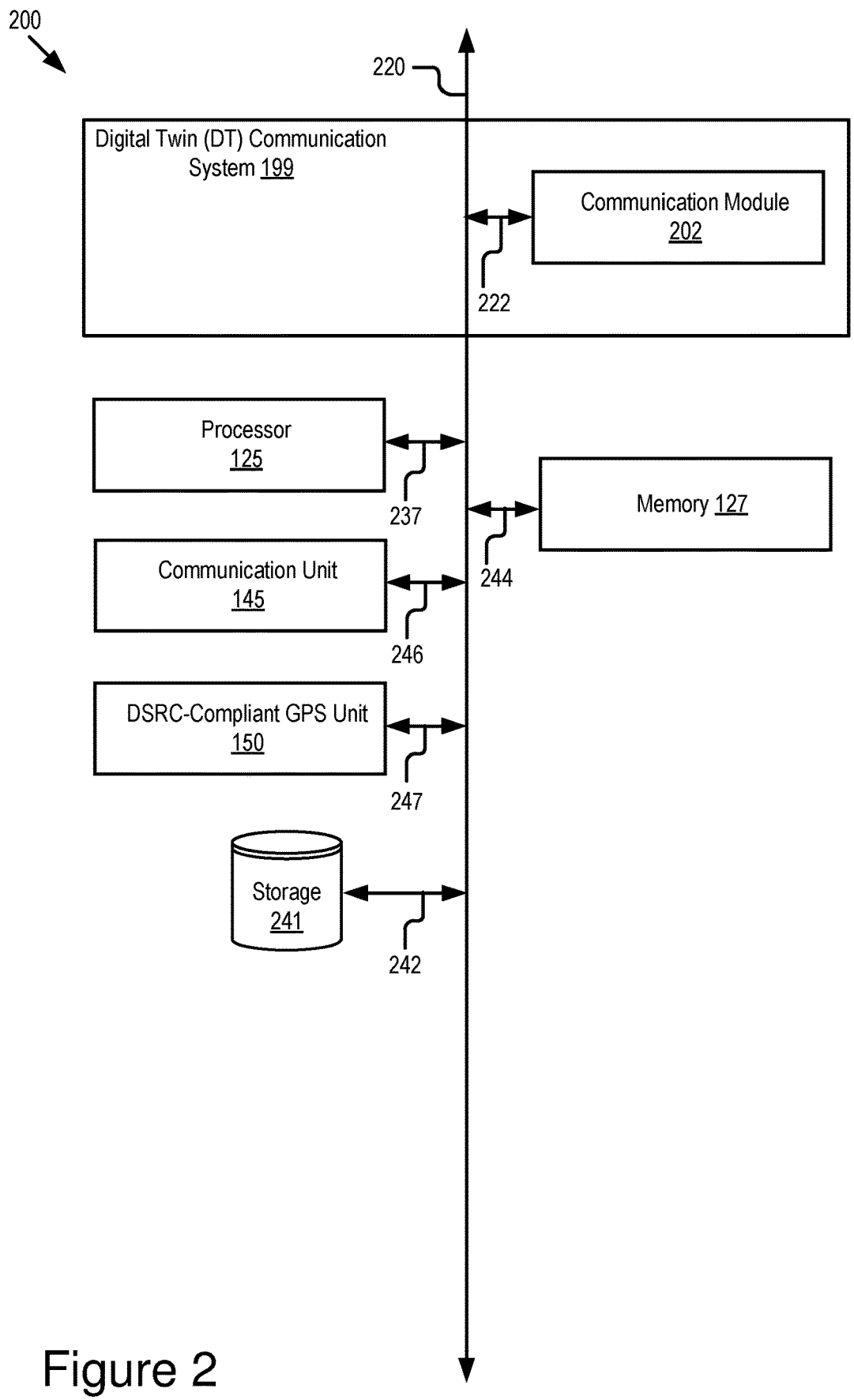
FIG. 2 is a block diagram illustrating an example computer system including a DT communication system according to some embodiments.

In some embodiments, the cloud server 102 is the computer system 200 depicted in FIG. 2.

The memory 127, communication unit 145, and the processor 125 of the cloud server 102 are similar to those described above for the ego vehicle 123, and so, those descriptions will not be repeated here.

The memory 127 of the cloud server 102 stores context data 195, simulation data 194, digital twin data 193, and communication plan data 192, as well as any other digital data that is necessary for the DT communication system 199 to provide its functionality.

The context data 195 stored by the memory 127 of the cloud server 102 includes a set of context data 195 from one or more vehicles such as the ego vehicle 123 and the remote vehicle 124.

The context data 195 is described above with reference to the ego vehicle 123, and so, that description will not be repeated here.

The digital twin data 193 includes digital data that describes a set of digital twins for one or more of the ego vehicle 123 and the remote vehicle 124. In some embodiments, the digital twin data 193 includes digital data that describes digital twins for each of the transmitters and the recipients described by the context data 195. In some embodiments, the digital twin data 193 describes digital twins for each of the objects in the roadway environment which is described by the context data 195 and/or the sensor data 191.

In some embodiments, the digital twin data 193 includes digital data describing virtual versions of the real-world vehicles assisted by the DT communication system 199. For example, the digital twin data 193 describes virtual versions of the receivers of the non-vehicular messages. These virtual versions of the receivers may describe the receivers as they exist in the real-world. In some embodiments, the digital twins are virtual versions of the real-world vehicles assisted by our invention. In some embodiments, the descriptions of these receivers by the digital twin data 193 exact or substantially exact relative to the condition of the receivers in the real word.

In some embodiments, the DT communication system 199 receives the digital twin data 193 from the receivers when they register to receive the service provided by the cloud server 102. In some embodiments, the data necessary to generate the digital twin data 193 is included in the context data 195. In some embodiments, the digital twin data 193 is gathered from automobile dealerships or other service centers when the receivers are serviced provided the owners or drivers of these vehicles have provided their informed consent to the collection of the digital twin data 193.

The simulation data 194 is digital data that describes a set of digital twin simulations to be executed by the DT communication system 199. The set of digital twin simulations are operable to replicate with the receivers of the non-vehicular messages transmitted by the cloud server 102 are experiencing in the real-world. In some embodiments, the set of digital twin simulations exactly simulate one or more of the following: what the set of connected vehicles (i.e., the receivers of the non-vehicular messages) are experiencing presently in the real-world; and what the set of connected vehicles are predicted to experience in the future in the real-world.

In some embodiments, the roadside device 103 includes sensors such as those included in the sensor set 126 and the roadside device gathers sensor data which is transmitted to the DT communication system 199 and used to generate the simulation data 194. Similarly, the ego vehicle 123 and the remote vehicle 124 may provide their sensor data 191 to the DT communication system 199 which then uses this data to generate the simulation data 194. In some embodiments, the simulation data 194 is generated based on satellite images or images captured by drones or other flying craft; these images may then be provided to the cloud server 102 so that the DT communication system 199 can generate the simulation data 194.

Digital twins and using digital twins in simulations is described in U.S. patent application Ser. No. 15/908,768 filed on Feb. 28, 2018 and entitled "Proactive Vehicle Maintenance Scheduling based on Digital Twin Simulations" as well as U.S. patent application Ser. No. 16/007,693 filed on Jun. 13, 2018 and entitled "Digital Twin for Vehicle Risk Evaluation," the entirety of each of which is hereby incorporated by reference. In some embodiments, the DT communication system 199 includes some or all of the simulation software and digital data described in these patent applications.

In some embodiments, the DT communication system 199 includes code and routines that are operable, when executed by the processor 125, to execute one or more steps of one or more of the methods 300, 400 described herein with reference to FIGS. 3 and 4, respectively.

In some embodiments, the DT communication system 199 executes the set of digital twin simulations based on one or more of the following: the context data 195; the simulation data 194; and the digital twin data 193. In some embodiments, the DT communication system 199 monitors the digital twin simulations as they are executed. The digital twin simulations simulate various scenarios for the cloud server 102 to transmit non-vehicular messages that correspond to the vehicular messages described by the context data 195.

In some embodiments, the DT communication system 199 monitors the digital twin simulations and generates communication plan data 192 based on what it observes during these digital twin simulations. For example, the DT communication system 199: (1) observes patterns from the execution of virtualized versions of non-vehicular communications which correspond to the vehicular communications described by the context data 195; and (2) determines an optimum communication plan for transmitting a set of non-vehicular communications that correspond to these vehicular communications.

The non-vehicular communications correspond to the vehicular communications because they are transmitted to the same recipients, include the same payload, and satisfy any deadline which is described in the context data 195 which describes these vehicular communications. Put another way, the non-vehicular communications described by the communication plan achieves, when transmitted by the cloud server 102, the desired result of transmitting the set of vehicular communications which are described by the context data 195.

In some embodiments, the communication plan data 192 is digital data that describes a communication plan for how the non-vehicular communications are to be transmitted; the non-vehicular communications described by the communication plan are those which achieve the desired result of transmitting the set of vehicular communications which the vehicles which provided the context data 195 were to transmit. The communication plan generated by the DT communication system 199 considers all critical information, including, for example: the recipients for these wireless communications (e.g., the recipients of the non-vehicular messages described by the communication plan data 192); the deadlines for these wireless communications; the anticipated latency for transmitting these wireless communications (because, for example, this latency may affect the deadlines); the payloads to be included in these wireless communications; factors which make some wireless communications more important than other such as whether transmission of the wireless communication increases the safety of a vehicle or would prevent a collision (such wireless communications may be given a higher priority and transmitted sooner than others); and other factors which are related to or derivative of those described here. These factors are described by the context data 195 or inferable by the DT communication system 199 based on analysis of the context data 195 (e.g., during the course of the digital twin simulations).

The DT communication system 199 causes the cloud server 102 to transmit a set of non-vehicular communications based on the communication plan data 192. In this way, the cloud server 102 successfully transmits, in the real-world, a non-vehicular communication for each of the vehicular communications that the real-world vehicles were to complete in the future as described by Part 2 of the context data 195. In some embodiments, each of the non-vehicular communications are completed before any deadline occurs. These non-vehicular communications also include the appropriate payloads and are completed in accordance with the communication plan which was determined by the DT communication system 199 based on the digital twin simulations. In this way, the real-world vehicles which provide context data 194 to the DT communication system 199 offload responsibility for completing their real-world vehicular communications to the cloud server 102 which itself uses digital twin simulations to optimize the completion of non-vehicular versions of these vehicular communications in the real word.

In some embodiments, the DT communication system 199 is a standalone simulation software stored on the cloud server 102 that includes code and routines that are operable to provide the functionality of the DT communication system 199 as described above. In some embodiments, the DT communication system 199 is a plugin for an existing simulation software which is stored and executed by the cloud server 102. The simulation software may include a game engine and any other software or digital data that is necessary to provide the functionality of generating and executing the digital twin simulations described herein.

In some embodiments, the DT communication system 199 is beneficially operable to help real-world vehicles to successfully complete wireless communications before they are in V2V, V2I, or V2X communication range of one another and before a safety critical event occurs (e.g., a wreck or collision, a near miss, or any other type of event occurring on a roadway which might affect a driver's safety or diminish the driver's confidence in the ability of their vehicle to keep them safe).

In some embodiments, the DT communication system 199 is beneficially operable to help two or more vehicles having a same manufacturer to use standardized V2V, V2I, and/or V2X communication methods while completing these communications in ways that are not constrained by the limitations of these standards; because of this the DT communication system 199 beneficially enables the routing, planning, and successful transmission of non-vehicular communications in accordance with the priorities of an operator of the cloud server 102 (e.g., a vehicular manufacturer) and not the priorities of the standards creation bodies (e.g., the bodies that create standards for V2V, V2I, and/or V2X communications. In some embodiments, the functionality provided by the DT communication system 199 is 100% compliant with the existing standards (e.g., the standards for V2V, V2I, and/or V2X communications).

In some embodiments, the DT communication system 199 is implemented using hardware including an FPGA or an ASIC. In some other embodiments, the DT communication system 199 is implemented using a combination of hardware and software.

Referring now to FIG. 2, depicted is a block diagram illustrating an example computer system 200 including a DT communication system 199 according to some embodiments.

In some embodiments, the computer system 200 may include a special-purpose computer system that is programmed to perform one or more steps of one or more of the methods 300, 400 described herein with reference to FIGS. 3 and 4, respectively.

In some embodiments, the computer system 200 may include a processor-based computing device. For example, the computer system 200 may include an onboard vehicle computer system of the ego vehicle 123 or the remote vehicle 124; the computer system 200 may also include an onboard computer system of the roadside device 103.

The computer system 200 may include one or more of the following elements according to some examples: the DT communication system 199; a processor 125; a communication unit 145; a DSRC-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the DSRC-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the DT communication system 199 includes code and routines that are operable, when executed by the processor 125, to cause the processor 125 to execute one or more steps of one or more of the methods 300, 400 described herein with reference to FIGS. 3 and 4, respectively.

In the illustrated embodiment shown in FIG. 2, the DT communication system 199 includes a communication module 202. Optionally, the DT communication system 199 may include a game engine software (not pictured) and/or a simulation software.

The communication module 202 can be software including routines for handling communications between the DT communication system 199 and other components of the computer system 200. In some embodiments, the communication module 202 can be a set of instructions executable by the processor 125 to provide the functionality described below for handling communications between the DT communication system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100 or the operating environment 101.

In some embodiments, the communication module 202 receives data from components of the DT communication system 199 and stores the data in one or more of the storage 241 and the memory 127.

In some embodiments, the communication module 202 may handle communications between components of the DT communication system 199 or the computer system 200.

Referring now to FIG. 3, depicted is a flowchart of an example method 300 for a cloud server to transmit a set of wireless communications according to some embodiments. The method 300 includes steps 305, 310, and 315 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Referring now to FIG. 4, depicted is a flowchart of an example method 400 for a cloud server to transmit a set of wireless communications according to some embodiments. The method 400 includes steps 405, 410, and 415 as depicted in FIG. 4.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising computer code installed in a memory of a cloud server which is operable, when executed by a processor of the cloud server, to cause the processor to execute steps comprising:
   wirelessly receiving, by the cloud server, context data from a set of connected vehicles, wherein the context data describes (1) a context for the set of connected vehicles and (2) a set of vehicular communications to be sent by the set of connected vehicles, including digital data describing payloads and recipients for these vehicular communications;
   executing a set of digital twin simulations based on the context data to generate communication plan data describing a communication plan for transmitting a set of non-vehicular communications which include identical payloads and recipients for the set of vehicular communications; and
   wirelessly transmitting, by the cloud server, the set of non-vehicular communications in compliance with the communication plan.

2. The computer program product of claim 1, wherein the cloud server is the only endpoint that transmits the set of non-vehicular communications.

3. The computer program product of claim 1, wherein the context includes one or more of a current context for the set of connected vehicles or a future expected context of the set of connected vehicles.

4. The computer program product of claim 1, wherein the context data further describes deadlines for the set of vehicular communications and the set of non-vehicular communications are transmitted by the cloud server in compliance with the deadlines.

5. The computer program product of claim 1, wherein the set of digital twin simulations is consistent with the context data so that digital twin simulations included in the set exactly simulate one or more of the following: what the set of connected vehicles are experiencing presently in a real-world; or what the set of connected vehicles are predicted to experience in a future in the real-world.

6. The computer program product of claim 5, wherein the digital twin simulations include a virtual execution of the set of non-vehicular communications which achieve an identical result as the vehicular communications described by the context data because the set of non-vehicular communications have the identical payloads and recipients described by the context data.

7. The computer program product of claim 6, wherein the virtual execution occurs in various ways in the digital twin simulations so that the communication plan is optimized based on the execution of the digital twin simulations.

8. A method comprising:
   wirelessly receiving, by a cloud server, context data from a set of connected vehicles, wherein the context data describes (1) a context for the set of connected vehicles and (2) a set of wireless communications to be sent by the set of connected vehicles;
   executing a set of digital twin simulations based on the context data to generate communication plan data describing a communication plan for transmitting the set of wireless communications; and
   wirelessly transmitting, by the cloud server, the set of wireless communications in compliance with the communication plan.

9. The method of claim 8, wherein the cloud server is the only endpoint that transmits the set of wireless communications.

10. The method of claim 8, wherein the context includes one or more of a current context for the set of connected vehicles or a future expected context of the set of connected vehicles.

11. The method of claim 8, wherein the context data describes: (1) payloads for the set of wireless communications, (2) deadlines for the set of wireless communications, and (3) intended end recipients for the payloads.

12. The method of claim 8, wherein the set of digital twin simulations is consistent with the context data so that digital twin simulations included in the set reflect one or more of the following: what the set of connected vehicles are experiencing presently in a real-world; or what the set of connected vehicles are predicted to experience in a future in the real-world.

13. The method of claim 12, wherein the digital twin simulations include a virtual execution of non-vehicular versions of the set of wireless communications described by the context data.

14. The method of claim 13, the virtual execution occurs in various ways in the digital twin simulations so that the communication plan is optimized based on the execution of the digital twin simulations.

15. A system of a cloud server comprising:
   a communication unit which is operable to wirelessly receive context data from a set of connected vehicles, wherein the context data describes (1) a context for the set of connected vehicles and (2) a set of wireless communications to be sent by the set of connected vehicles;
   a processor communicatively coupled to the communication unit to receive the context data from the communication unit, wherein the processor is operable to execute a set of digital twin simulations based on the context data to generate communication plan data describing a communication plan for transmitting the set of wireless communications and the communication unit is operable to wirelessly transmit the set of wireless communications in compliance with the communication plan.

16. The system of claim 15, wherein the cloud server is the only endpoint that transmits the set of wireless communications.

17. The system of claim 15, wherein the context includes one or more of a current context for the set of connected vehicles or a future expected context of the set of connected vehicles.

18. The system of claim 15, wherein the context data describes: (1) payloads for the set of wireless communications, (2) deadlines for the set of wireless communications, and (3) intended end recipients for the payloads.

19. The system of claim 15, wherein the set of digital twin simulations is consistent with the context data so that digital twin simulations included in the set reflect one or more of the following: what the set of connected vehicles are experiencing presently in a real-world; or what the set of connected vehicles are predicted to experience in a future in the real-world.

20. The system of claim 19, wherein the digital twin simulations include a virtual execution of non-vehicular versions of the set of wireless communications described by the context data and the communication plan is optimized based on the execution of the digital twin simulations.

* * * * *